(12) United States Patent
Tanaka et al.

(10) Patent No.: US 12,162,352 B2
(45) Date of Patent: Dec. 10, 2024

(54) VEHICLE DISPLAY CONTROL APPARATUS AND VEHICLE DISPLAY CONTROL METHOD

(71) Applicant: Panasonic Intellectual Property Management Co., Ltd., Osaka (JP)

(72) Inventors: Naoki Tanaka, Osaka (JP); Yasutoshi Yamamoto, Osaka (JP); Tomoka Ishibashi, Osaka (JP); Hiroyasu Makino, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 899 days.

(21) Appl. No.: 17/086,906

(22) Filed: Nov. 2, 2020

(65) Prior Publication Data

US 2021/0197666 A1 Jul. 1, 2021

(30) Foreign Application Priority Data

Dec. 26, 2019 (JP) .................................. 2019-237032

(51) Int. Cl.
*B60K 35/00* (2024.01)
*B60K 35/28* (2024.01)
(Continued)

(52) U.S. Cl.
CPC ............. *B60K 35/00* (2013.01); *B60W 40/09* (2013.01); *B60W 50/14* (2013.01); *B60K 35/28* (2024.01);
(Continued)

(58) Field of Classification Search
None
See application file for complete search history.

(56) References Cited

U.S. PATENT DOCUMENTS

2010/0253526 A1* 10/2010 Szczerba .............. G08B 21/06
340/576
2017/0106750 A1 4/2017 Tauchi et al.
(Continued)

FOREIGN PATENT DOCUMENTS

JP 2015-197706 11/2015
JP 2017-215816 12/2017

OTHER PUBLICATIONS

Office Action from Japan Patent Office (JPO) in Japanese Patent Appl. No. 2019-237032, dated Aug. 1, 2023, together with an English language translation.

*Primary Examiner* — James J Lee
*Assistant Examiner* — Andrew Sang Kim
(74) *Attorney, Agent, or Firm* — Greenblum & Bernstein, P.L.C.

(57) ABSTRACT

A display controller converts a detection target region contained within a detection range of an obstruction sensor group and extending from a vehicle to the periphery thereof into a virtual marker image and causes a virtual image to be displayed by superimposing the image over a scene in front of the vehicle. When the relative position of an obstruction is within the detection target region, the display controller causes an arc-shaped ripple spreading in a direction based on the relative position of the obstruction to be displayed in a region, of the virtual marker image, located in a direction based on the relative position of the obstruction. The display controller converts the important information into a notification image and causes the notification image to be displayed in a display medium. The display controller changes the display format of at least one of the virtual marker image or the notification image.

13 Claims, 15 Drawing Sheets

(51) Int. Cl.
   *B60K 35/81*   (2024.01)
   *B60W 40/08*   (2012.01)
   *B60W 40/09*   (2012.01)
   *B60W 50/14*   (2020.01)

(52) U.S. Cl.
   CPC ........ *B60K 35/81* (2024.01); *B60K 2360/166* (2024.01); *B60K 2360/175* (2024.01); *B60K 2360/178* (2024.01); *B60K 2360/179* (2024.01); *B60K 2360/31* (2024.01); *B60W 2040/0818* (2013.01); *B60W 2050/143* (2013.01); *B60W 2050/146* (2013.01); *B60W 2540/30* (2013.01)

(56) References Cited

U.S. PATENT DOCUMENTS

| | | | | |
|---|---|---|---|---|
| 2018/0157036 A1* | 6/2018 | Choi | .................. | G02B 27/0179 |
| 2019/0371281 A1* | 12/2019 | Koyama | ............ | G02B 27/0101 |
| 2021/0049985 A1* | 2/2021 | Kusanagi | ................ | G09G 5/38 |

* cited by examiner

VEHICLE DISPLAY CONTROL APPARATUS AND VEHICLE DISPLAY CONTROL METHOD

CROSS REFERENCE TO RELATED APPLICATION

The present application is based on and claims priority of Japanese Patent Application No. 2019-237032 filed on Dec. 26, 2019.

FIELD

The present disclosure relates to a vehicle display control apparatus.

BACKGROUND

PTL 1 discloses a vehicle display apparatus that enables a driver to intuitively understand at least a range over which an obstruction sensor detects obstructions.

CITATION LIST

Patent Literature

PTL 1: Japanese Unexamined Patent Application Publication No. 2015-197706

SUMMARY

However, the vehicle display apparatus according to PTL 1 can be improved upon.

In view of this, the present disclosure provides a vehicle display control apparatus capable of further improving upon the related art.

A vehicle display control apparatus according to one aspect of the present disclosure is a vehicle display control apparatus that controls a display device which is installed in a vehicle and which, by projecting an image onto a display medium, superimposes the image over a scene in front of the vehicle to cause a driver to see a superimposed image as a virtual image. The vehicle display control apparatus includes: an obstruction detector that, based on a result of detection by an obstruction sensor that detects an obstruction present in a periphery of the vehicle, detects obstruction information including a relative position and a relative speed of the obstruction relative to the vehicle; and an important information determiner that obtains information including the periphery of the vehicle and a state of the vehicle, and detects, as important information, information that is to be communicated to the driver preferentially over the obstruction information detected by the obstruction detector. The apparatus further includes a display controller that: when the obstruction sensor is operating, converts, into a virtual marker image, a detection target region which is contained within a detection range of the obstruction sensor and which extends from the vehicle to the periphery of the vehicle along a road surface, and causes a virtual image to be displayed by superimposing the virtual marker image over the scene in front of the vehicle using the display device; when the relative position of the obstruction is within the detection target region, causes an image indicating a direction in which the obstruction is located to be displayed in a region of the virtual marker image in a direction based on the relative position of the obstruction, using the obstruction information; and when the important information is detected, converts the important information into a notification image and causes the notification image to be displayed at a predetermined position of the display medium using the display device. When causing the virtual marker image and the notification image to be displayed simultaneously, the display controller changes a display format of at least one of the virtual marker image or the notification image.

A vehicle display control method according to one aspect of the present disclosure is a vehicle display control method of controlling a display device which is installed in a vehicle and which, by projecting an image onto a display medium, superimposes the image over a scene in front of the vehicle to cause a driver to see a superimposed image as a virtual image. The vehicle display control method includes: detecting, based on a result of detection by an obstruction sensor that detects an obstruction present in a periphery of the vehicle, obstruction information including a relative position and a relative speed of the obstruction relative to the vehicle; obtaining information including the periphery of the vehicle and a state of the vehicle, and detecting, as important information, information that is to be communicated to the driver preferentially over the obstruction information detected by the obstruction detector; when the obstruction sensor is operating, converting, into a virtual marker image, a detection target region which is contained within a detection range of the obstruction sensor and which extends from the vehicle to the periphery of the vehicle along a road surface, and causing a virtual image to be displayed by superimposing the virtual marker image over the scene in front of the vehicle using the display device; when the relative position of the obstruction is within the detection target region, causing an image indicating a direction in which the obstruction is located to be displayed in a region of the virtual marker image in a direction based on the relative position of the obstruction, using the obstruction information; and when the important information is detected, converting the important information into a notification image and causing the notification image to be displayed at a predetermined position of the display medium using the display device. When causing the virtual marker image and the notification image to be displayed simultaneously, a display format of at least one of the virtual marker image or the notification image is changed.

Note that these comprehensive or specific aspects may be realized by a system, a method, an integrated circuit, a computer program, or a computer-readable non-transitory recording medium such as a CD-ROM, or may be implemented by any desired combination of systems, devices, methods, integrated circuits, computer programs, and non-transitory recording media.

The vehicle display control apparatus according to one aspect of the present disclosure is capable of further improving upon the related art.

According to the vehicle display control apparatus of the present disclosure, a vehicle display control apparatus and the like which do not interfere with the recognition of important information can be provided.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Figure 1:
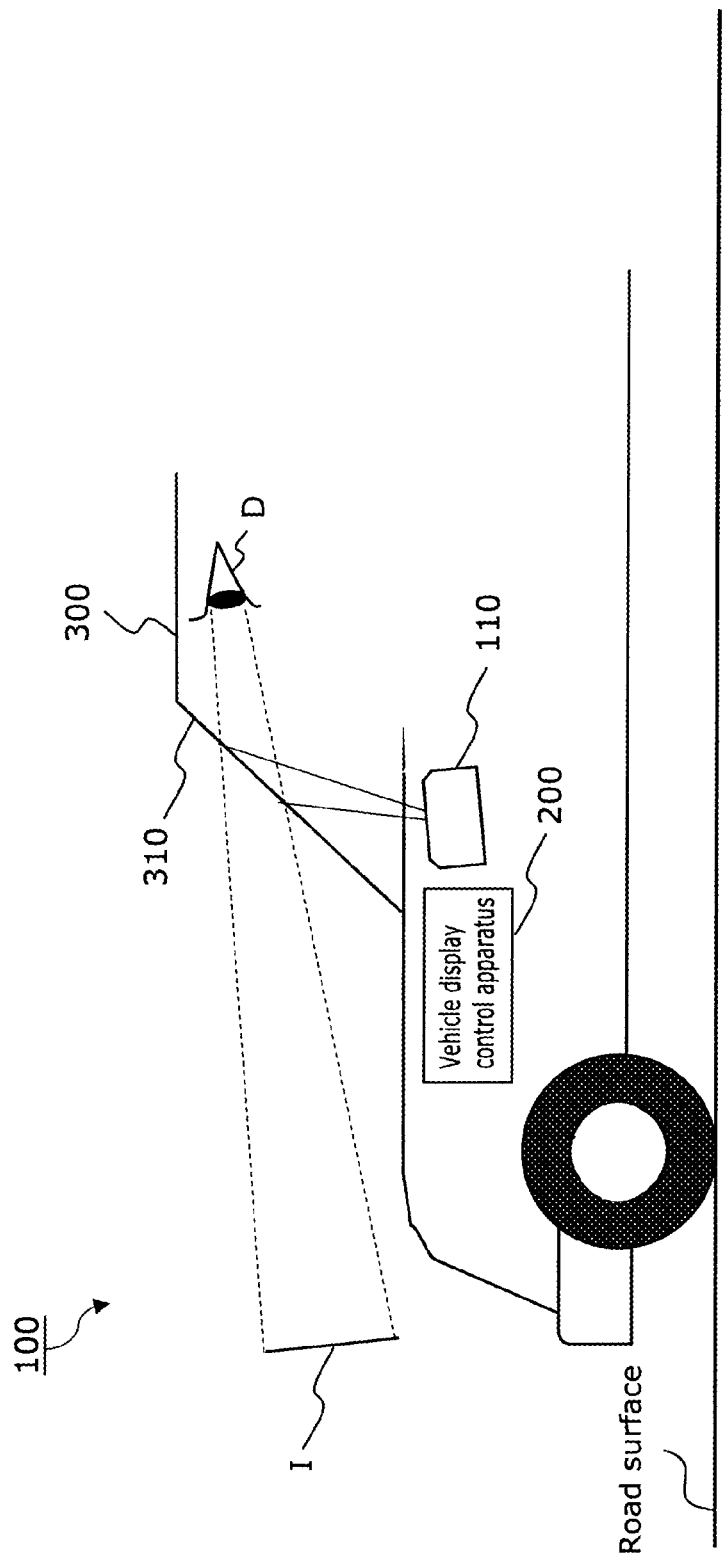
FIG. 1 is a diagram illustrating an example of the use of a driving assistance system according to Embodiment 1.

Findings Serving as Basis of Present Disclosure

The inventors of the present disclosure discovered that the vehicle display apparatus described above in the Background section has the following problems.

Although the technique disclosed in PTL 1 enables a driver to intuitively know the detection range of an obstruction sensor, when the driver is to be notified of information which is more important than an obstruction, there are situations where information displaying the detection range interferes with the recognition of the important information.

The present disclosure provides a vehicle display control apparatus and the like which do not interfere with the recognition of important information when important information has been generated.

A vehicle display control apparatus according to one aspect of the present disclosure is a vehicle display control apparatus that controls a display device which is installed in a vehicle and which, by projecting an image onto a display medium, superimposes the image over a scene in front of the vehicle to cause a driver to see a superimposed image as a virtual image. The vehicle display control apparatus includes: an obstruction detector that, based on a result of detection by an obstruction sensor that detects an obstruction present in a periphery of the vehicle, detects obstruction information including a relative position and a relative speed of the obstruction relative to the vehicle; an important information determiner that obtains information including the periphery of the vehicle and a state of the vehicle, and detects, as important information, information that is to be communicated to the driver preferentially over the obstruction information detected by the obstruction detector; and a display controller that (i) when the obstruction sensor is operating, converts, into a virtual marker image, a detection target region which is contained within a detection range of the obstruction sensor and which extends from the vehicle to the periphery of the vehicle along a road surface, and causes a virtual image to be displayed by superimposing the virtual marker image over the scene in front of the vehicle using the display device, (ii) when the relative position of the obstruction is within the detection target region, causes an image indicating a direction in which the obstruction is located to be displayed in a region of the virtual marker image in a direction based on the relative position of the obstruction, using the obstruction information, and (iii) when the important information is detected, converts the important information into a notification image and causes the notification image to be displayed at a predetermined position of the display medium using the display device. When causing the virtual marker image and the notification image to be displayed simultaneously, the display controller changes a display format of at least one of the virtual marker image or the notification image.

According to this aspect, when the driver is to be notified of information which is more important than an obstruction, a virtual marker image indicating obstruction information reduces interference with the recognition of a notification image indicating important information. The driver's recognition of the information which is more important than an obstruction can therefore be improved.

Additionally, in the vehicle display control apparatus, the vehicle may include a navigation device that outputs guidance information including at least one of route information, traffic congestion information, and warning information, and the important information determiner may detect the guidance information from the navigation device as the important information.

According to this aspect, the important information determiner can detect information which is important from information of the vehicle surroundings. This makes it possible to reduce the likelihood of a traffic accident.

Additionally, in the vehicle display control apparatus, the vehicle may include a vehicle/driver state sensor group that detects a state of the vehicle or a state of the driver, and the important information determiner may detect, as the important information, information indicating an abnormal state of the vehicle or an abnormal state of the driver from the state of the vehicle or the state of the driver detected by the vehicle/driver state sensor group.

According to this aspect, the important information determiner can detect information which is important from the vehicle itself. This makes it possible to reduce the likelihood of a traffic accident.

Additionally, in the vehicle display control apparatus, the vehicle may include a vehicle controller that controls driving of the vehicle and outputs driving information indicating a driving state of the vehicle, and the important information determiner may detect the important information from the driving information output by the vehicle controller.

According to this aspect, the important information determiner can detect information which is important from the vehicle itself. This makes it possible to reduce the likelihood of a traffic accident.

Additionally, in the vehicle display control apparatus, the display controller may change the display format of the notification image to a display format that is more noticeable than the virtual marker image.

According to this aspect, the important information can be communicated to the driver in an intuitive manner. This makes it possible to reduce the likelihood of a traffic accident.

Additionally, in the vehicle display control apparatus, the display controller may change the display format of the virtual marker image to a display format that is less noticeable than the notification image.

According to this aspect, the important information can be communicated to the driver in an intuitive manner. This makes it possible to reduce the likelihood of a traffic accident.

Additionally, in the vehicle display control apparatus, when it is determined that the driver sees the virtual marker image and the notification image in an overlapping state, the display controller may change a display position of the notification image.

According to this aspect, the important information can be communicated to the driver in an intuitive manner. This makes it possible to reduce the likelihood of a traffic accident.

Additionally, in the vehicle display control apparatus, when it is determined that the driver sees the virtual marker image and the notification image in an overlapping state, the display controller may change at least one of the display formats to a display format in which the driver does not see the virtual marker image and the notification image in an overlapping state.

According to this aspect, the important information can be communicated to the driver in an intuitive manner. This makes it possible to reduce the likelihood of a traffic accident.

Additionally, in the vehicle display control apparatus, when it is determined that the driver sees the virtual marker image and the notification image in an overlapping state, the display controller may perform control so that the virtual marker image is not displayed in the display device.

According to this aspect, the important information can be communicated to the driver in an intuitive manner. This makes it possible to reduce the likelihood of a traffic accident.

Additionally, in the vehicle display control apparatus, the display controller may output the obstruction information to a navigation device included in the vehicle display control apparatus.

Additionally, in the vehicle display control apparatus, the vehicle may include an audio outputter, and when causing the notification image to be displayed in the display device, the display controller may cause the audio outputter to output audio indicating the important information.

In this manner, the important information can be communicated to the driver in an intuitive manner by communicating the important information through the audio outputter.

Additionally, in the vehicle display control apparatus, the display controller may cause an arc-shaped ripple spreading in a direction corresponding to the relative position of the obstruction to be displayed as the image indicating the direction in which the obstruction is located.

Additionally, a vehicle display control method according to one aspect of the present disclosure is a vehicle display control method of controlling a display device which is installed in a vehicle and which, by projecting an image onto a display medium, superimposes the image over a scene in front of the vehicle to cause a driver to see a superimposed image as a virtual image. The vehicle display control method includes: detecting, based on a result of detection by an obstruction sensor that detects an obstruction present in a periphery of the vehicle, obstruction information including a relative position and a relative speed of the obstruction relative to the vehicle; obtaining information including the periphery of the vehicle and a state of the vehicle, and detecting, as important information, information that is to be communicated to the driver preferentially over the obstruction information; when the obstruction sensor is operating, converting, into a virtual marker image, a detection target region which is contained within a detection range of the obstruction sensor and which extends from the vehicle to the periphery of the vehicle along a road surface, and causing a virtual image to be displayed by superimposing the virtual marker image over the scene in front of the vehicle using the display device; when the relative position of the obstruction is within the detection target region, causing an image indicating a direction in which the obstruction is located to be displayed in a region of the virtual marker image in a direction based on the relative position of the obstruction, using the obstruction information; and when the important information is detected, converting the important information into a notification image and causing the notification image to be displayed at a predetermined position of the display medium using the display device. When causing the virtual marker image and the notification image to be displayed simultaneously, a display format of at least one of the virtual marker image or the notification image is changed.

According to this aspect, when the driver is to be notified of information which is more important than an obstruction, a virtual marker image indicating obstruction information reduces interference with the recognition of a notification image indicating important information. The driver's recognition of the information which is more important than an obstruction can therefore be improved.

Embodiments will be described in detail hereinafter with reference to the drawings where appropriate. However, descriptions which are more detailed than necessary will not be given. For example, detailed descriptions of matters which are already well-known, redundant descriptions of substantially identical configurations, and so on may be omitted. This is to avoid unnecessary redundancy in the descriptions and facilitate understanding for those skilled in the art.

Note that the accompanying drawings and the following descriptions have been provided so that those skilled in the art can sufficiently understand the present disclosure, and as such the content of the scope of claims is not intended to be limited by the drawings and descriptions in any way.

Embodiment 1

1-1. Configuration of Driving Assistance System

Figure 2:
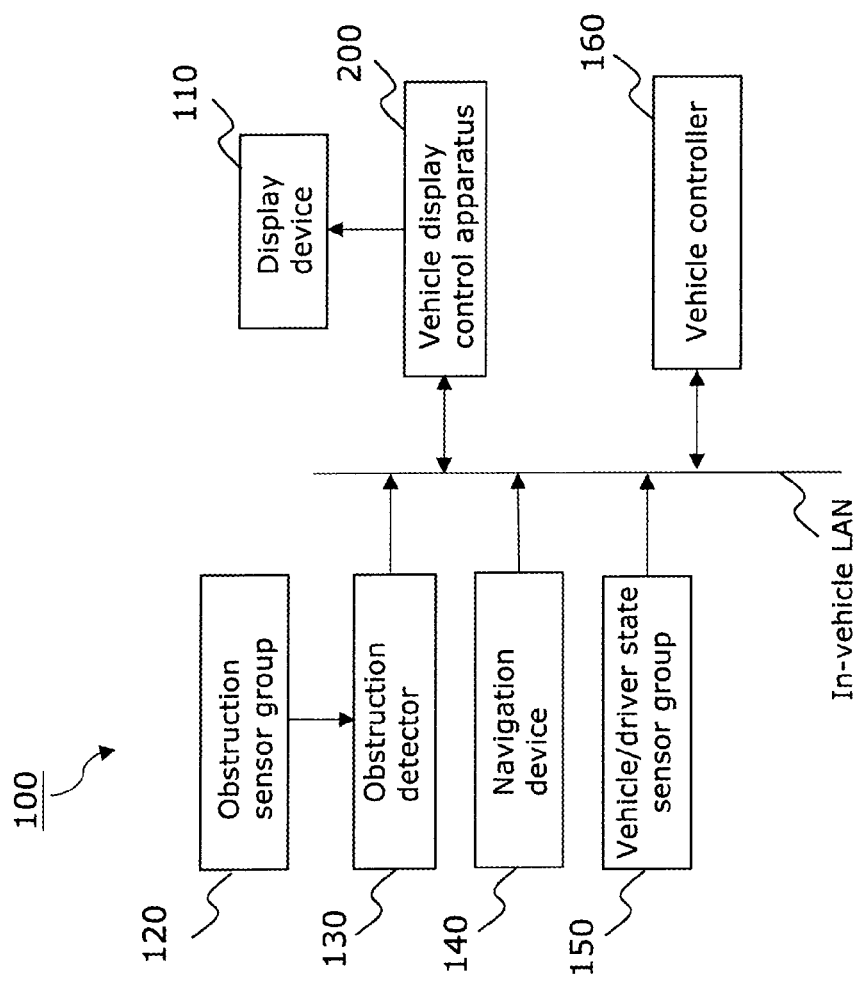
FIG. 2 is a diagram illustrating an example of the configuration of the driving assistance system according to Embodiment 1.

FIG. 1 is a diagram illustrating an example of the use of driving assistance system 100 according to Embodiment 1. FIG. 2 is a block diagram illustrating an example of the configuration of driving assistance system 100 according to the present embodiment.

Driving assistance system 100 according to the present embodiment includes display device 110, obstruction sensor group 120, obstruction detector 130, navigation device 140, vehicle/driver state sensor group 150, vehicle controller 160, and vehicle display control apparatus 200. Obstruction detector 130, navigation device 140, vehicle/driver state sensor group 150, vehicle controller 160, and vehicle display control apparatus 200 are connected over an in-vehicle LAN.

Display device 110 is configured as an in-vehicle heads-up display (HUD), and is attached near an upper surface of a dashboard (not shown) of vehicle 300. Display device 110 projects light onto a display region of windshield 310, which serves as a display medium. The projected light is reflected by windshield 310. This reflected light goes to eye D of a driver who is seated in a driver's seat and is a user of display device 110. The driver perceives the reflected light entering eye D as virtual image I, which is seen on the opposite side of windshield 310 (outside vehicle 300) against the background of what is actually visible through windshield 310.

In this manner, display device 110 projects an image onto the display medium, which is then visible to the driver as a virtual image superimposed on the scene in front of the vehicle. In other words, display device 110 displays virtual image I using the display medium. Display device 110 displays an image output by vehicle display control apparatus 200 as a virtual image.

Obstruction sensor group 120 is various types of sensors installed in vehicle 300 for detecting obstructions (pedestrians, vehicles, including bicycles and motorcycles, and other objects) present in the around vehicle 300. Obstruction sensor group 120 includes an image sensor and an object detection sensor, for example. The image sensor takes pictures of the surroundings of vehicle 300. Image sensors such as a Complementary Metal Oxide Semiconductor (CMOS) image sensor and a Charge-Coupled Device (CCD) image sensor can be given as examples of the image sensor. The object detection sensor detects objects present around vehicle 300. Light Detection and Ranging (LiDAR), millimeter wave radar, ultrasonic radar, sonar, and the like can be given as examples of the object detection sensor. The sensors in obstruction sensor group 120 may have different detection ranges, e.g., all directions around vehicle 300 may be used for the detection range by combining a plurality of sensors having different detection ranges. Obstruction sensor group 120 outputs detection results to vehicle display control apparatus 200.

Figure 3:
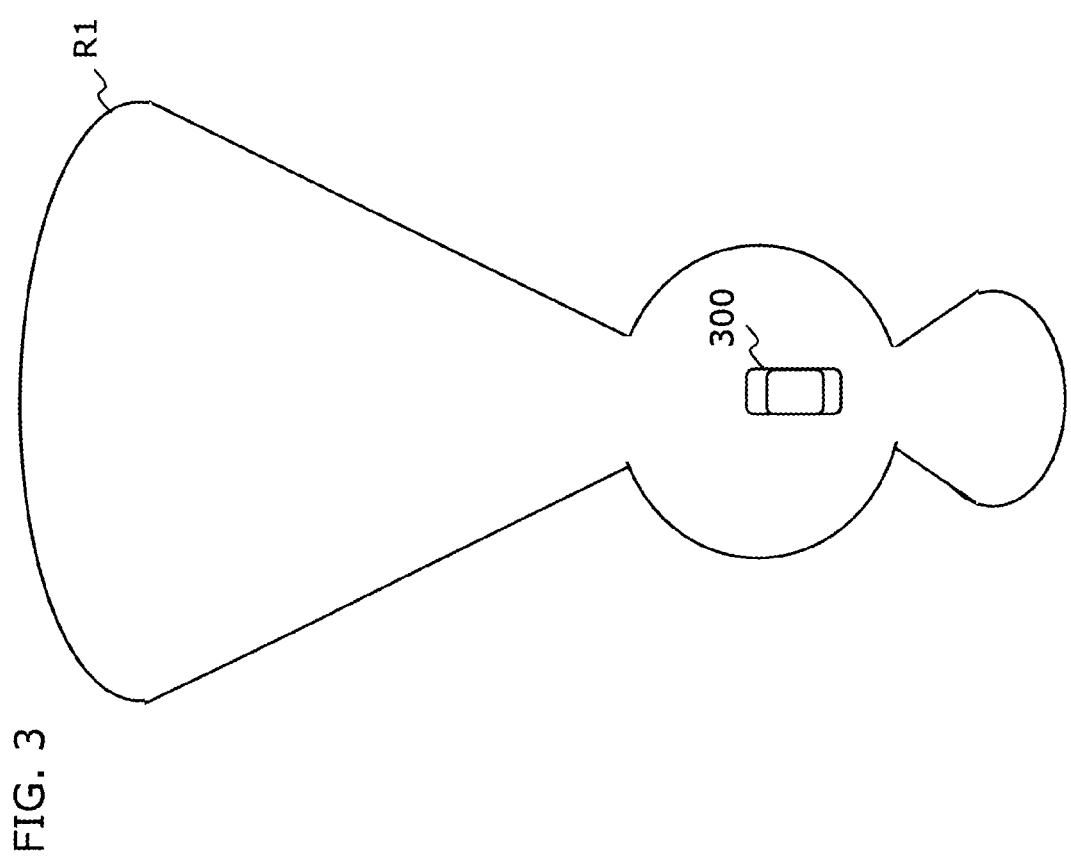
FIG. 3 is a schematic diagram illustrating an example of a detection range of an obstruction sensor group.

The detection range of obstruction sensor group 120 will be described here. FIG. 3 is a schematic diagram illustrating an example of the detection range of obstruction sensor group 120. In FIG. 3, R1 indicates the detection range of obstruction sensor group 120. R1 indicates a combination of the detection ranges of a plurality of obstruction sensors having different detection ranges. As indicated in FIG. 3, the detection range of obstruction sensor group 120 covers all directions of vehicle 300.

Obstruction detector 130 controls the operations of obstruction sensor group 120. Obstruction detector 130 detects an obstruction present around vehicle 300 on the basis of detection results from obstruction sensor group 120, and outputs obstruction information including a relative position and a relative speed of the detected obstruction relative to vehicle 300. Obstruction detector 130 outputs the detected obstruction information to vehicle display control apparatus 200.

When obstruction sensor group 120 includes LiDAR, millimeter wave radar, laser radar, or sonar, obstruction detector 130 detects a nearby obstruction by obtaining a reflected wave resulting from a transmitted wave. The direction of the obstruction relative to vehicle 300 is detected based on the direction from which the reflected wave is received, and the distance from vehicle 300 to the obstruction is detected from the time from when the transmitted wave is output to when the reflected wave is received.

When obstruction sensor group 120 is a camera, obstruction detector 130 detects obstructions around vehicle 300 by obtaining an image captured by the camera and performing predetermined image analysis on the obtained image. More specifically, obstruction detector 130 may detect the position of an obstruction relative to vehicle 300 (i.e., the distance and direction with respect to vehicle 300) by performing predetermined moving image analysis on a plurality of captured moving images to the front (or the side, or the rear) of vehicle 300. Alternatively, obstruction detector 130 may detect a motion distribution, which is the relative position and relative motion of the obstruction, relative to vehicle 300.

Navigation device 140 outputs guidance information including at least one of route information, traffic congestion information, and warning information. Navigation device 140 includes a display and a speaker (not shown), and outputs images and audio, including the route information for guiding the travel of vehicle 300, to the display and the speaker. Navigation device 140 outputs the route information that, based on a destination input by the driver, guides the driver along a route to the destination. Navigation device 140 includes a communicator (not shown), and obtains the traffic congestion information, accident information, weather information, and the like provided by a traffic information providing server (VICS (registered trademark) or the like) via the communicator. Navigation device 140 outputs various types of information which may affect travel, such as the route information, the traffic congestion information, the accident information, and the weather information, to vehicle display control apparatus 200 as the guidance information.

Vehicle/driver state sensor group 150 is various sensors installed in vehicle 300 for detecting a state of vehicle 300 or a state of the driver of vehicle 300. Of vehicle/driver state sensor group 150, sensors which detect the state of the vehicle include a vehicle speed sensor, an accelerometer, an angular velocity sensor, a receiver used in a satellite positioning system, a steering angle sensor, a door sensor, a fuel sensor, a seat belt sensor, a brake sensor, an engine sensor, and the like, for example. The sensors which detect the state of the driver includes a cabin camera, a steering wheel grip sensor, a back pressure sensor, a seat pressure sensor, a biological information sensor, and the like. The vehicle speed sensor detects the speed of vehicle 300, the accelerometer detects acceleration acting on vehicle 300, and the angular velocity sensor detects an angular velocity (yaw rate) of vehicle 300 about a vertical axis. The receiver used in the satellite positioning system obtains data indicating a current position by receiving radio waves from a positioning satellite, the steering angle sensor detects a steering angle of vehicle 300, and the door sensor detects whether a door is open or closed. The fuel sensor detects a state of fuel, the seat belt sensor detects whether or not a seat belt is being worn, the brake sensor detects a state of a brake, and the engine sensor detects malfunctions and abnormalities in an engine compartment and the like. The cabin camera is installed so as to capture an image of the driver's face, and detects the direction in which the driver's face is facing, the direction of the driver's gaze, the degree to which the driver's eyes are open, and the like. The steering wheel grip sensor detects pressure acting on the steering wheel. The back pressure sensor detects a distribution of pressure acting on the backrest of the driver's seat, and the seat pressure sensor detects a distribution of pressure acting on the seat surface of the driver's seat. The biological information sensor is, for example, a heart rate sensor that measures a heart rate. Vehicle/driver state sensor group 150 outputs the detected information to vehicle display control apparatus 200.

Vehicle controller 160 controls the driving of vehicle 300 and outputs driving information indicating a driving state of the vehicle. Vehicle controller 160 controls vehicle 300 based on the information output from obstruction detector 130, vehicle/driver state sensor group 150, and so on. Vehicle controller 160 is, for example, an advanced driver-assistance system (ADAS) or an autonomous driving system. Vehicle controller 160 obtains information pertaining to the speed of vehicle 300, information pertaining to autonomous driving, information pertaining to the states of other vehicles in the periphery of vehicle 300, and the like, and controls the speed, steering angle, and the like of vehicle 300. Vehicle controller 160 outputs information indicating the driving state of the vehicle, such as the speed of vehicle 300 and the state of vehicle 300, to vehicle display control apparatus 200.

Vehicle display control apparatus 200 controls display device 110. When obstruction sensor group 120 is operating, vehicle display control apparatus 200 generates a virtual marker image indicating the detection range and the obstruction information of obstruction sensor group 120 from the information input from obstruction detector 130, and causes display device 110 to display the virtual marker image. Vehicle display control apparatus 200 detects important information to be communicated to the driver from the information input from navigation device 140, vehicle/driver state sensor group 150, and vehicle controller 160. The important information will be described later. When the important information has been detected, vehicle display control apparatus 200 converts the important information into a notification image and causes the notification image to be displayed in display device 110. When causing the virtual marker image and the notification image to be displayed simultaneously, vehicle display control apparatus 200 changes the display format of at least one of the virtual marker image or the notification image.

Vehicle display control apparatus 200 can be implemented by, for example, one or more processors (microprocessors) and one or more memories. In other words, by executing one or more programs stored in one or more memories, the one or more processors function as vehicle display control apparatus 200. The one or more programs may be stored in memory in advance, or may be provided over a telecommunication line such as the Internet or having been recorded in a non-transitory recording medium such as a memory card.

1-2. Configuration of Vehicle Display Control Apparatus

Figure 4:
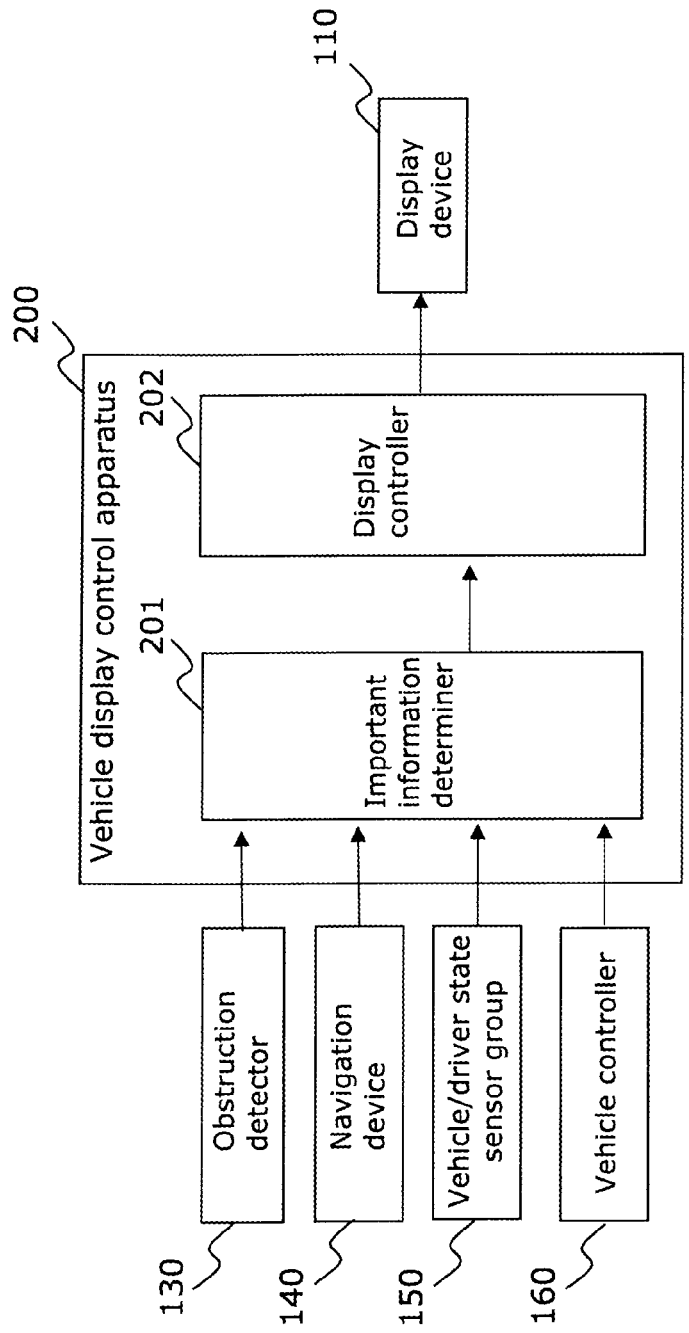
FIG. 4 is a block diagram illustrating the configuration of a vehicle display control apparatus according to Embodiment 1.

FIG. 4 is a block diagram illustrating an example of the configuration of vehicle display control apparatus 200 according to Embodiment 1.

Vehicle display control apparatus 200 according to the present embodiment includes important information determiner 201 and display controller 202. Vehicle display control apparatus 200 is an electric circuit. Important information determiner 201 and display controller 202 are not physical configurations, but are rather functions realized by vehicle display control apparatus 200.

Important information determiner 201 obtains information including the periphery and the vehicle state of vehicle 300, and detects important information which is to be communicated to the driver. Specifically, important information determiner 201 determines whether or not there is information to be communicated to the driver from among the information output from navigation device 140, vehicle/driver state sensor group 150, and vehicle controller 160, and extracts information which is to be communicated preferentially over the obstruction information as the important information. Important information determiner 201 outputs the extracted important information to display controller 202.

When obstruction sensor group 120 is operating, display controller 202 converts a detection target region, which is contained within the detection range of obstruction sensor group 120 and which extends from vehicle 300 to the periphery thereof along a road surface, into a virtual marker image, and causes that image to be displayed as a virtual image superimposed over the scene to the front of vehicle 300 using display device 110. Furthermore, when the relative position of an obstruction detected by obstruction detector 130 is within the detection target region, display controller 202 causes an image indicating the direction in which the obstruction to be displayed in a region located in a direction based on the relative position of the obstruction. In the present embodiment, display controller 202 causes an arc-shaped ripple, spreading in a direction corresponding to the relative position of the obstruction, to be displayed as the image indicating the direction in which the obstruction is located. When the important information has been detected by important information determiner 201, display controller 202 converts the important information into the notification image and causes the notification image to be displayed in a predetermined position of the display medium using display device 110. When causing the virtual marker image and the notification image to be displayed simultaneously, display controller 202 changes the display format of at least one of the virtual marker image or the notification image.

1-2-1. Determination of Important Information

Information determined to be important information by important information determiner 201 will be described next.

Important information determiner 201 extracts, as the important information, the guidance information including at least one of the route information, road information, warning information, incoming communication information such as a phone call, and emergency information from the information output from navigation device 140. The route information is, for example, information indicating that a right or left turn must be made when the vehicle approaches an intersection, a highway, or the like, information that there is a road closure and a route change is necessary, information that a lane change is necessary, and so on. The road information includes traffic congestion information, speed limit information, accident-prone zone information, information indicating no-passing zones, and the like. The warning information is information notifying the driver that they are traveling the wrong way on a road, high wind information notifying the driver when approaching a tunnel where strong winds are occurring, and the like. The emergency information is emergency evacuation information issued in the event of an earthquake, a disaster, and the like.

Important information determiner 201 extracts, as the important information, information indicating an abnormal state of the vehicle from the information output from the vehicle/driver state sensor group 150. The abnormal state of the vehicle is, for example, a door being open partway, low fuel such as gasoline or electricity, a seat belt not being worn, moving with the parking brake set, a malfunction or abnormality in the engine compartment or the like, an abnormal tire pressure state, and so on. An abnormal state of the driver is, for example, a state where the driver is looking to the side, is distracted, is feeling drowsy, is paying little attention, and so on.

Important information determiner 201 detects the important information from information pertaining to speed, driving caution information, and the driving information pertaining to autonomous driving, among the information output from vehicle controller 160. The information pertaining to speed which is detected as the important information is, for example, information indicating that the vehicle should accelerate to follow the vehicle in front when the distance to that vehicle has increased, information indicating the speed limit being exceeded, information indicating that the speed limit has changed, and so on. The driving caution information is information that the vehicle is close to the vehicle in front and may cause a rear-end collision, information that the vehicle in front or behind is approaching at no less than a set relative speed and may cause a collision, information that the vehicle has entered a no U-turn zone, and so on. The information pertaining to autonomous driving is information indicating whether driving is autonomous driving or manual driving, information pertaining to the level of the autonomous driving, and so on.

Important information determiner 201 may use different criteria for determining the importance during autonomous driving and during manual driving. For example, notifications such as phone calls, social networking services (SNS), and emails are given a higher importance than the obstruction information during autonomous driving. However, these notifications are given a lower importance than the obstruction information during manual driving. This makes it possible to balance safety during manual driving with comfort during autonomous driving.

1-2-2. Display of Obstruction Information

Only the display of the obstruction information, controlled by display controller 202, will be described in this section. The display of the important information will be described later.

Display controller 202 converts the detection target region, which is within detection range R1 indicated in FIG. 3 and which extends from vehicle 300 to the periphery thereof along the road surface, into a virtual marker image expressing the viewpoint of the driver of vehicle 300, and causes that image to be displayed as a virtual image superimposed on the scene in front of vehicle 300 using display device 110.

Figure 5:
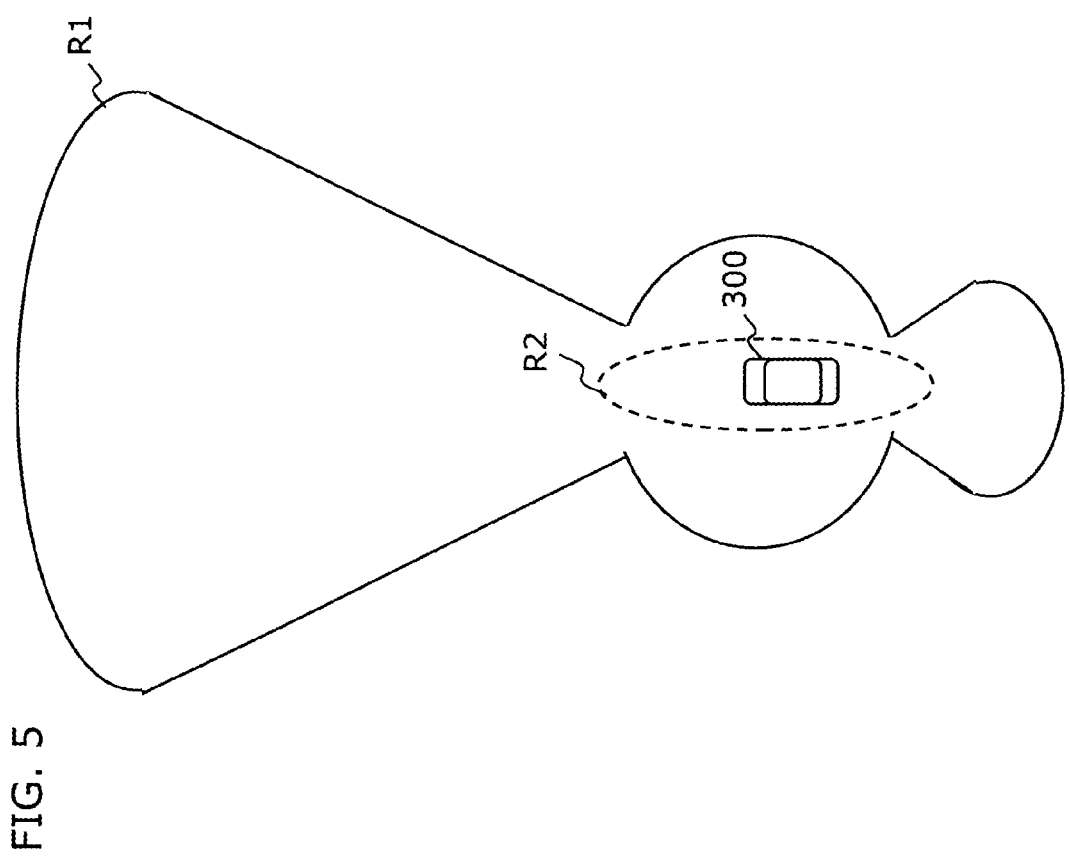
FIG. 5 is a schematic diagram illustrating an example of a detection target region.

FIG. 5 is a schematic diagram illustrating an example of the detection target region. Detection target region R2 is a region which the driver wishes to ascertain as the detection range of obstruction sensor group 120. Thus as illustrated in FIG. 5, it is sufficient for detection target region R2 to be within detection range R1 of obstruction sensor group 120. Detection target region R2 may be set in advance, or the driver may set the range thereof using input means such as switches (not shown). Furthermore, display controller 202 may change the range of the set detection target region R2 in accordance with the speed of vehicle 300. For example, display controller 202 may broaden detection target region R2 as the speed of vehicle 300 increases, and narrow the range of detection target region R2 as the speed decreases.

Detection target region R2 is, for example, a flat region extending in the horizontal direction from vehicle 300 when vehicle 300 is located on a horizontal plane. As illustrated in FIG. 5, detection target region R2 may have a shape which is longer in a longitudinal direction of vehicle 300 than in a width direction of vehicle 300 and extends along the lane. Detection target region R2 may be expressed as a plane having a constant height in a world coordinate system which takes, for example, a lateral direction of vehicle 300 as an X axis, the longitudinal direction as a Y axis, and a height direction as a Z axis. The value of the Z axis may be set to a value which is not too far from the road surface. For example, if the height of the road surface is 0, the Z-axis value may be set to within a range of 1 m.

If it has been determined, based on the information output from obstruction detector 130, that there is an obstruction in detection target region R2, display controller 202 changes the display format of detection target region R2 in accordance with the relative position of the obstruction relative to vehicle 300. Specifically, display controller 202 sets an alert region, which communicates the presence of the obstruction, in detection target region R2, in a region corresponding to a direction based on the relative position of the obstruction.

Figure 6:
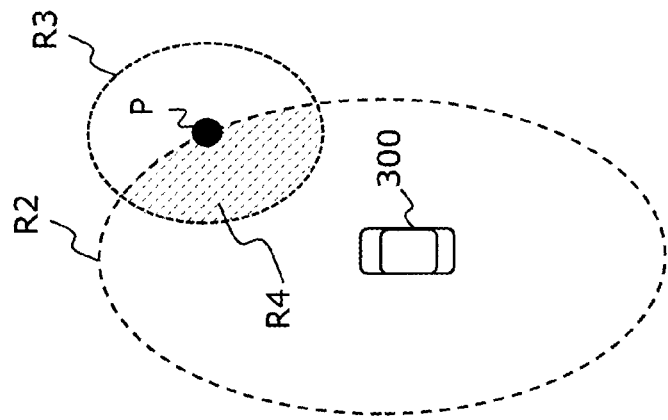
FIG. 6 is a schematic diagram illustrating an example of the display of an alert region.
Figure 7:
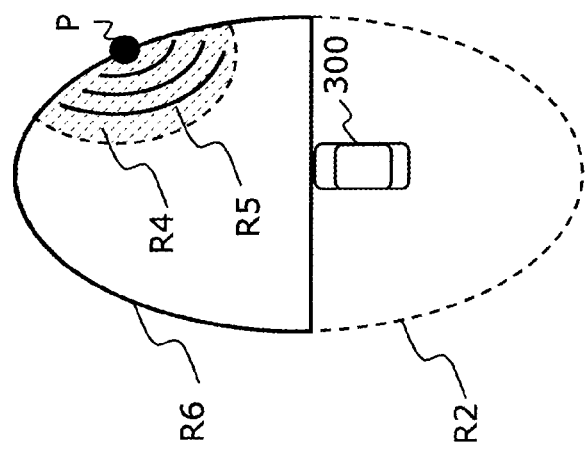
FIG. 7 is a schematic diagram illustrating another example of the display of an alert region.

FIG. 6 is a schematic diagram illustrating an example of the display of the alert region. FIG. 7 is a schematic diagram illustrating another example of the display of the alert region.

In FIG. 6, P is a point indicating the position of an obstruction (e.g., a center point), R2 indicates the detection target region, and R3 indicates a predetermined range (e.g., an ellipse or a circle) which is centered on the position P of the obstruction and contains the obstruction. Furthermore, a part where detection target region R2 and predetermined range R3 overlap is set as alert region R4, which indicates the presence of the obstruction.

Display controller 202 may notify the driver of the presence of the obstruction by using a different display format for alert region R4 from that used for detection target region R2. For example, display controller 202 uses different colors for alert region R4 and detection target region R2. Additionally, as illustrated in FIG. 7, display controller 202 may display arc-shaped ripples R5, spreading from the direction in which the obstruction is located, in alert region R4. Arc-shaped ripples R5 may be displayed so that the ripple appears to be moving in the direction of the spread. The interval between arc-shaped ripples R5 may be reduced as the relative speed of the obstruction increases. Additionally, the distance to the relative position of the obstruction may be represented by the number of ripples R5. Note that display controller 202 may display an image aside from ripples as the image indicating the direction of the obstruction. For example, the image may have a shape extending radially from the point P or be a symbol such as an exclamation mark. The image may border the perimeter of an obstruction present within display range 311, or a figure that fills in the obstruction may be displayed. Meanwhile, when the relative position of the obstruction is within detection target region R2 but is not located in front of vehicle 300, i.e., is located outside region R6, an icon or the like may be displayed indicating that the obstruction is behind the vehicle, for example.

Display controller 202 cuts region R6 in front of vehicle 300 out of detection target region R2, which includes alert region R4, converts the cut-out region into a virtual marker image indicating the detection target region and the presence of an obstruction in that direction, and displays the image in display device 110. Note that even if the obstruction is located within detection target region R2, the notification image need not be generated and displayed if the obstruction is located in the oncoming lane. This makes it possible to avoid the hassle of obstruction information being displayed every time an oncoming vehicle is passed.

1-3. Operations

Display operations of vehicle display control apparatus 200 according to Embodiment 1 will be described next.

1-3-1. Flow of Operations

Figure 8:
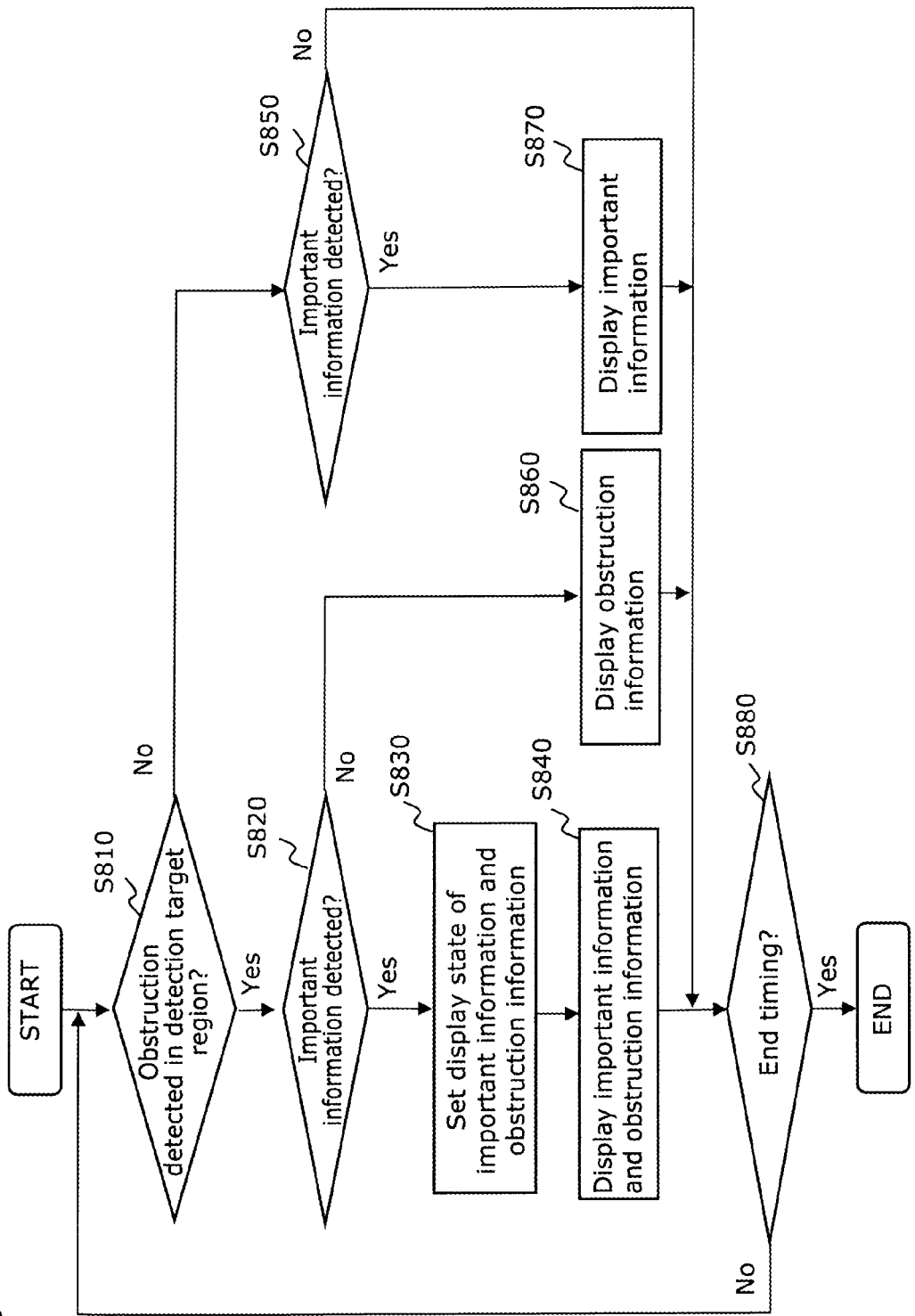
FIG. 8 is a flowchart illustrating an example of operations of a display controller according to Embodiment 1.

FIG. 8 is a flowchart illustrating an example of operations of display controller 202 according to Embodiment 1.

Display controller 202 may start this processing when, for example, information indicating obstruction sensor group 120 is operating has been output from obstruction detector 130.

First, in step S810, display controller 202 determines, from the information output from obstruction detector 130, whether or not an obstruction has been detected in the detection target region. If in step S810 display controller 202 determines that an obstruction has been detected ("Yes" in step S810), the sequence moves to step S820, whereas if display controller 202 has determined that an obstruction has not been detected ("No" in step S810), the sequence moves to step S850.

In step S820, display controller 202 determines whether or not the important information has been detected from important information determiner 201. If in step S820 display controller 202 determines that the important information has been detected ("Yes" in step S820), the sequence moves to step S830, whereas if display controller 202 has determined that the important information has not been detected ("No" in step S820), the sequence moves to step S860.

In step S830, display controller 202 sets the display formats of the notification image indicating the important information and the virtual marker image indicating the obstruction information. Display controller 202 may set the display format of the notification image to be more noticeable than the virtual marker image so as to draw the driver's attention to the important information rather than the obstruction information. Alternatively, display controller 202 may set the display format of the virtual marker image to be less noticeable than the important information so as to draw the driver's attention to the important information rather than the obstruction information. Furthermore, display controller 202 may set the notification image to a display format which is more noticeable, and may set the virtual marker image to a display format which is less noticeable.

In step S840, display controller 202 converts the important information and the obstruction information to the notification image and the virtual marker image, respectively, in the set display formats, and causes display device 110 to display the notification image and the virtual marker image. Display controller 202 then moves the sequence to step S880.

In step S850, display controller 202 determines whether or not the important information has been detected from important information determiner 201. If in step S850 display controller 202 determines that the important information has been detected ("Yes" in step S850), the sequence moves to step S870, whereas if display controller 202 has determined that the important information has not been detected ("No" in step S850), the sequence moves to step S880.

In step S860, display controller 202 converts the obstruction information into the virtual marker image in a display target region and causes display device 110 to display the virtual marker image, after which the sequence moves to step S880.

In step S870, display controller 202 converts the important information into the notification image and causes display device 110 to display the notification image, after which the sequence moves to step S880.

In step S880, display controller 202 determines whether or not an end timing has been reached. If it is determined that the end timing has been reached ("Yes" in step S880), the sequence ends, whereas if it is determined that the end timing has not been reached ("No" in step S880), the sequence returns to step S810. Display controller 202 may determine that the end timing has been reached when, for example, information indicating obstruction sensor group 120 is not operating has been output from obstruction detector 130.

1-3-2. Examples of Operations

Examples of operations in the present embodiment will be described next with reference to the drawings. FIGS. 9 to 14 are schematic diagrams illustrating the area to the front of vehicle 300 from the driver's point of view. In FIGS. 9 to 14, display range 311 is a projection surface of windshield 310 where display device 110 projects images. Vehicle 300 will be referred to as a "host vehicle" hereinafter.

Display of Obstruction Information

Figure 9:
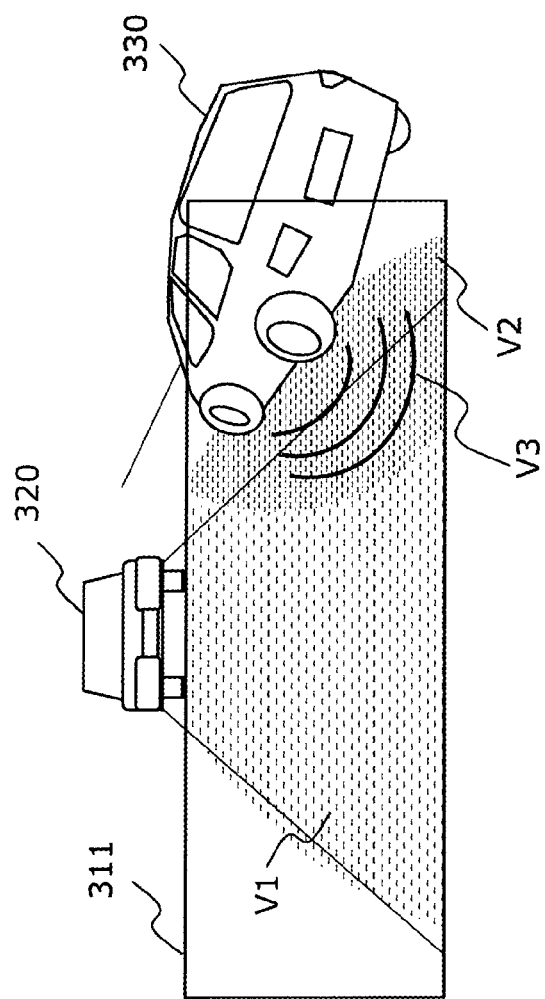
FIG. 9 is a schematic diagram illustrating an example of a display format of obstruction information.

FIG. 9 is a schematic diagram illustrating an example of the display format of the obstruction information. FIG. 9 illustrates a situation where vehicle 320 is located in front of the host vehicle, and vehicle 330 is located to the front-right of the host vehicle. It is assumed that when the host vehicle and vehicle 330 in FIG. 9 are viewed from above, the vehicles are in the positional relationship illustrated in FIG. 7. In other words, it is assumed that vehicle 330 is located at the position of point P. In FIG. 9, V1 indicates a virtual marker image obtained by converting region R6 in the front of detection target region R2 illustrated in FIG. 7, and because the host vehicle is located on the road surface, V1 is displayed as a flat region extending along the road surface. As illustrated in FIG. 7, vehicle 330, which acts as an obstruction, is located within detection target region R2, and thus alert region R4 is set within detection target region R2. V2 indicates the virtual marker image obtained by converting alert region R4. At this time, as illustrated in FIG. 7, virtual marker image V3, which is obtained by converting arc-shaped ripples R5, is displayed within virtual marker image V2. In this case, virtual marker image V1 is displayed in light green, and virtual marker image V2 is displayed in yellow, for example. Virtual marker image V1, virtual marker image V2, and virtual marker image V3 are generated separately, and are then visible to the driver as a superimposed virtual image.

The driver can intuitively understand the detection range of obstruction sensor group 120, and that vehicle 330 is present to the right-front of the host vehicle. Additionally, the magnitude of the relative speed of vehicle 330 relative to the host vehicle can be understood from the number, interval, and so on of the ripples.

Display of Important Information

Figure 10:
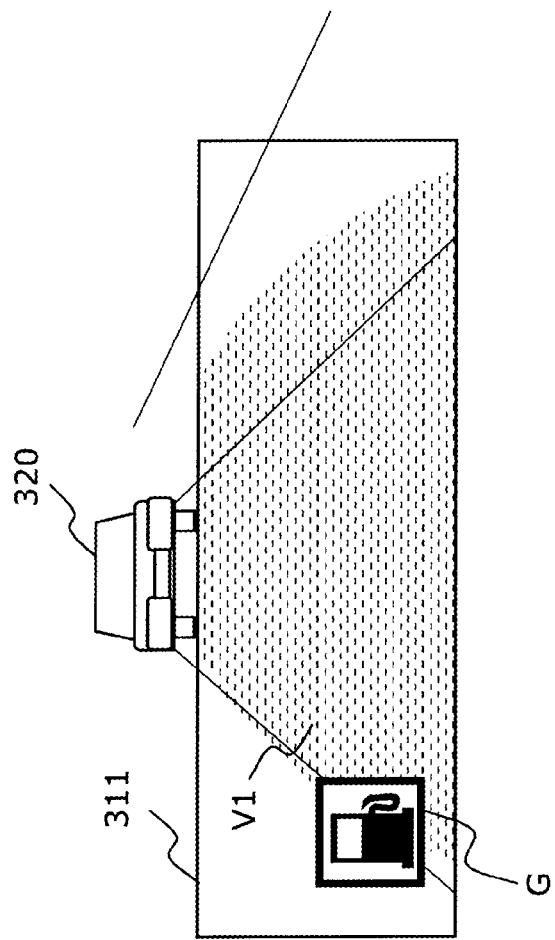
FIG. 10 is a schematic diagram illustrating an example of a display format of important information.

FIG. 10 is a schematic diagram illustrating an example of the display format of the important information. FIG. 10 illustrates a situation where vehicle 320 is located in front of the host vehicle, and the host vehicle is low on gasoline. In FIG. 10, V1 indicates a virtual marker image obtained by converting detection target region R2 of obstruction sensor group 120, and G indicates a notification image showing that the host vehicle is low on gasoline. Notification image G is stored in memory (not shown), and the display position, display format, and the like thereof are set in advance. FIG. 10 illustrates a case where the display position of the notification image G is set to the bottom-left. Display controller 202 causes display device 110 to display a predetermined notification image in a predetermined location when displaying only the important information.

Display for Making Important Information Noticeable

Figure 11:
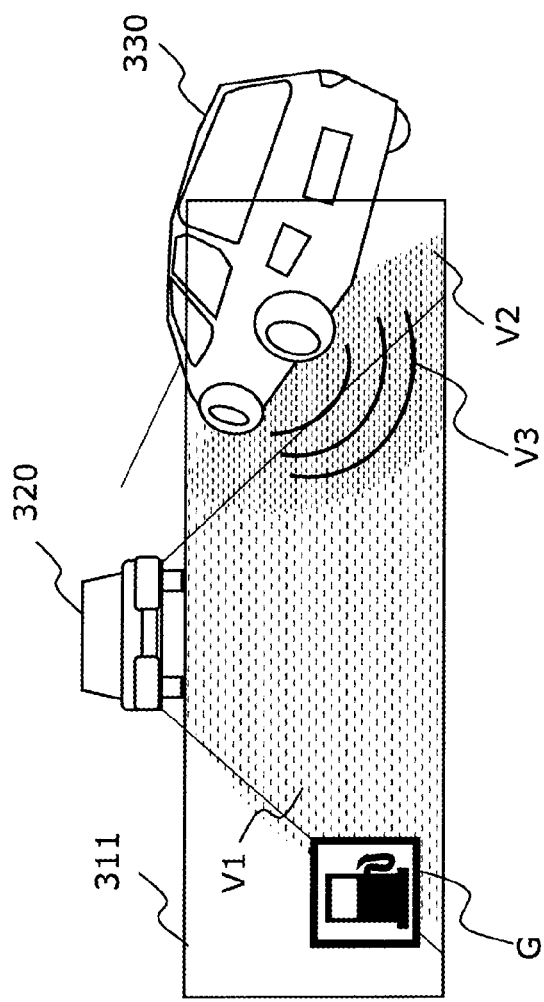
FIG. 11 is a schematic diagram illustrating another example of a display format of important information.
Figure 12:
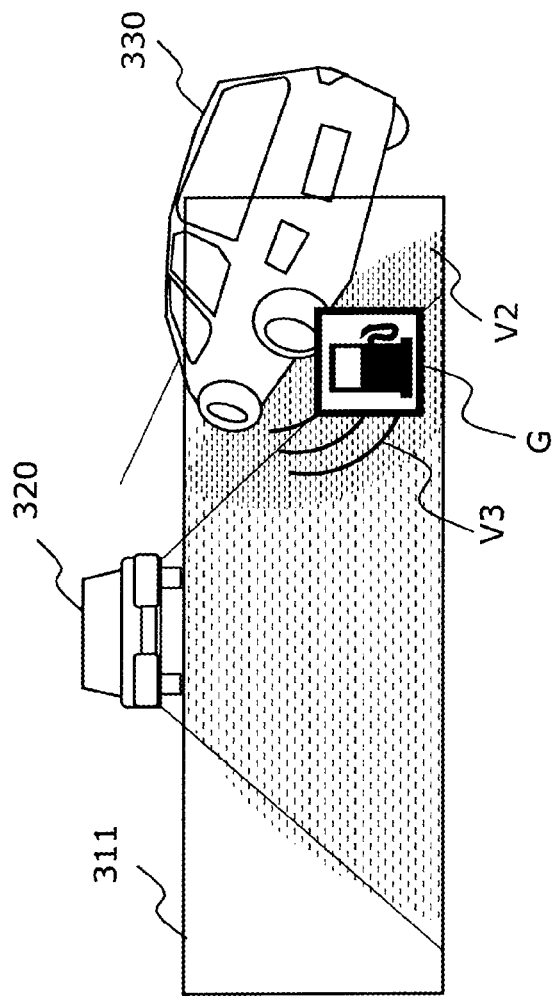
FIG. 12 is a schematic diagram illustrating another example of a display format of important information.

FIGS. 11 and 12 are schematic diagrams illustrating another example of the display format of the important information.

FIGS. 11 and 12 illustrate a situation where vehicle 320 is located in front of the host vehicle, vehicle 330 is located to the right-front of the host vehicle, and the host vehicle is low on gasoline. As illustrated in FIG. 11, when displaying the important information (notification image G) and the obstruction information (virtual marker images V1, V2, and V3) simultaneously, display controller 202 sets the display format of the important information to be more noticeable. In other words, display controller 202 changes the display format of notification image G so as to be more noticeable than virtual marker images V1, V2, and V3.

For example, notification image G may be displayed at a higher brightness to make notification image G more noticeable. The saturation of notification image G may be increased, or, for example, the color of notification image G may be changed to a warning color such as red. The color of notification image G may be changed to a complementary color of the background. For example, if the background contains green vegetation, the color of notification image G may be changed to red. Notification image G may also be displayed in a flashing manner. Notification image G may also be displayed such that the brightness thereof gradually increases. Text indicating the content of notification image G may also be displayed. Line parts of notification image G may be displayed with bold lines. If notification image G is text information, the text may be displayed in bold.

If it is determined that the virtual image and the notification image are seen by the driver in an overlapping state, display controller 202 may change the display position of the notification image. For example, as illustrated in FIG. 12, if the predetermined position of notification image G is the bottom-right, and virtual marker images V2 and V3 overlap with notification image G, notification image G may be moved to a different position from virtual marker images V2 and V3, as illustrated in FIG. 11.

Display in which Obstruction Information is Less Noticeable

Figure 13:
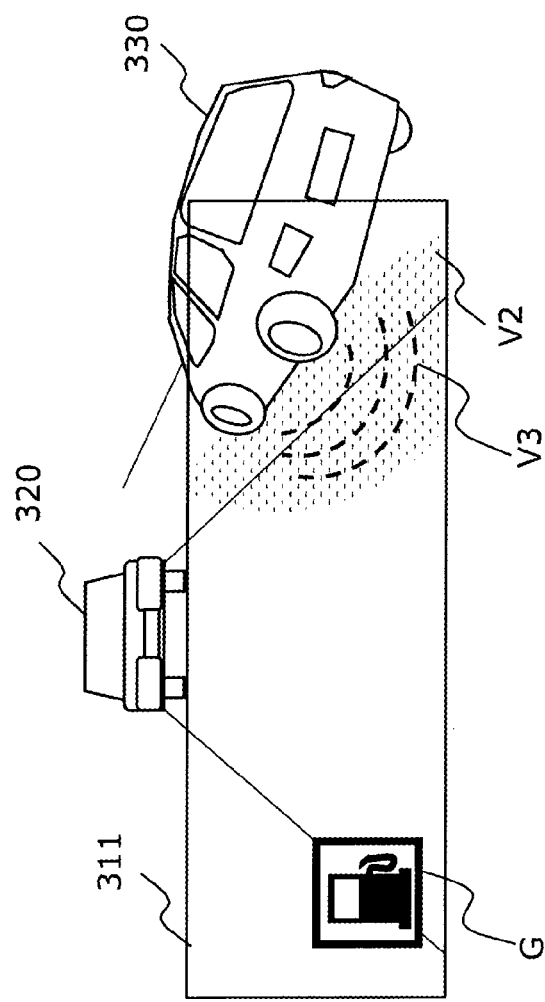
FIG. 13 is a schematic diagram illustrating another example of a display format of obstruction information.
Figure 14:
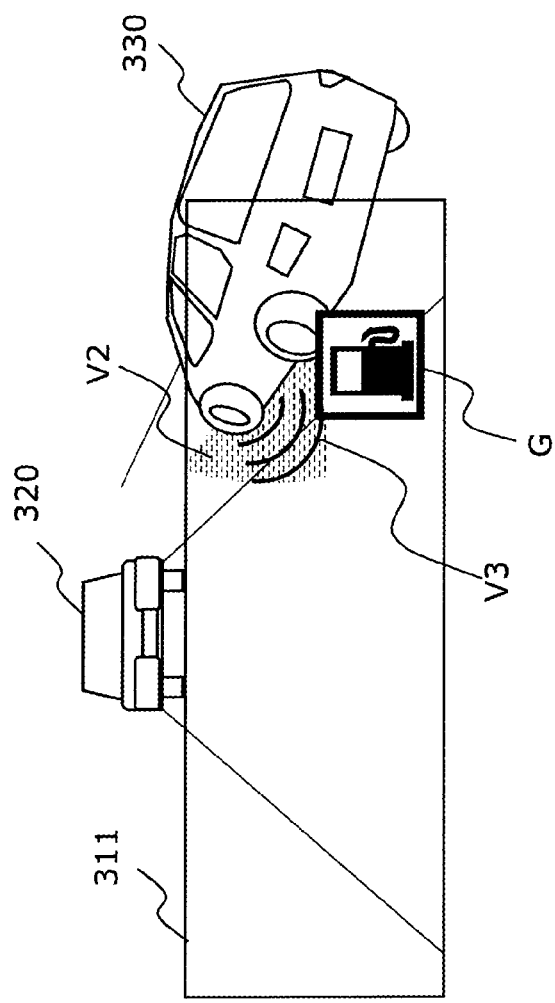
FIG. 14 is a schematic diagram illustrating another example of a display format of obstruction information.

FIGS. 13 and 14 are schematic diagrams illustrating another example of the display format of the obstruction information.

FIGS. 13 and 14 illustrate a situation where vehicle 320 is located in front of the host vehicle, vehicle 330 is located to the right-front of the host vehicle, and the host vehicle is low on gasoline. As illustrated in FIG. 11, when displaying the important information (notification image G) and the obstruction information (virtual marker images V2 and V3) simultaneously, display controller 202 sets the display format of the virtual marker image to be less noticeable.

As illustrated in FIG. 13, display controller 202 may display virtual marker image V3 with a light color or a dark color in order to make the obstruction information less noticeable. Virtual marker image V3 may also be displayed at a reduced size. Furthermore, as illustrated in FIG. 13, virtual marker image V1 indicating the detection target region may not be displayed at all. Also, as illustrated in FIG. 13, virtual marker image V3 may be displayed as dotted-line arcs instead of solid-line arcs. Virtual marker image V3 may also be arcs of thin lines.

If it is determined that the virtual marker image and the notification image are seen by the driver in an overlapping state, display controller 202 may control display device 110 not to display the virtual marker image. For example, in FIG. 13, virtual marker image V2 indicating the alert region, virtual marker image V3 indicating the arcs, and so on may not be displayed at all.

If it is determined that the virtual marker image and the notification image are seen by the driver in an overlapping state, display controller 202 may change the display formats so that the virtual marker image and the notification image are not seen by the driver in an overlapping state. For example, part of virtual marker image V3 may not be displayed at all, as illustrated in FIG. 14. Alternatively, virtual marker image V3 may be reduced to a size that does not overlap with the notification image. In this case, the size of virtual marker image V3 may be changed in accordance with the size of virtual marker image V2. A display in which virtual marker images V2 and V3 gradually disappear may be performed as well. Furthermore, the brightness of virtual marker images V2 and V3 may be gradually reduced. Virtual marker images V2 and V3 may also be set to the same color as the background.

Display controller 202 may cause the obstruction information to be displayed in the display of navigation device 140, without being displayed in display device 110. The obstruction information may be output as audio from the speaker of navigation device 140.

1-4. Effects, Etc.

As described above, in the present embodiment, obstruction detector 130 detects obstruction information including the relative position and the relative speed of an obstruction relative to vehicle 300 based on a detection result from obstruction sensor group 120, which detects an obstruction present in the periphery of vehicle 300. Important information determiner 201 obtains information including the periphery and the vehicle state of vehicle 300, and detects important information which is to be communicated to the driver. Display controller 202 converts a detection target region, which is contained within the detection range of obstruction sensor group 120 and which extends from vehicle 300 to the periphery thereof along a road surface, into a virtual marker image, and causes a virtual image to be displayed by superimposing the virtual marker image over the scene in front of vehicle 300 using display device 110. Furthermore, when the relative position of an obstruction detected by obstruction detector 130 is within the detection target region, display controller 202 causes an arc-shaped ripple spreading in a direction based on the relative position of the obstruction to be displayed in a region, of the virtual marker image, in a direction based on the relative position of the obstruction as an image indicating the direction in which the obstruction is present. When the important information has been detected by important information determiner 201, display controller 202 converts the important information into the notification image and causes the notification image to be displayed in a predetermined position of the display medium (windshield 310) using display device 110. When causing the virtual marker image and the notification image to be displayed simultaneously, display controller 202 changes the display format of at least one of the virtual marker image or the notification image.

According to this configuration, when the driver is to be notified of information which is more important than an obstruction, a virtual marker image indicating obstruction information reduces interference with the recognition of a notification image indicating important information. The driver's recognition of the information which is more important than an obstruction can therefore be improved.

Additionally, important information determiner 201 detects important information from the information output from navigation device 140, vehicle/driver state sensor group 150, and vehicle controller 160. According to this configuration, important information determiner 201 can detect information which is important from information of the vehicle itself and the vehicle surroundings. This makes it possible to reduce the likelihood of a traffic accident.

Additionally, display controller 202 changes the display format of the notification image so that the display format is more noticeable than the virtual marker image. Alternatively, display controller 202 changes the display format of the virtual marker image so that the display format is less noticeable than the notification image. Additionally, if it is determined that the driver sees the virtual marker image and the notification image in an overlapping state, display controller 202 changes the display position of the notification image. If it is determined that the driver sees the virtual marker image and the notification image in an overlapping state, display controller 202 changes the display formats so that the driver does not see the virtual marker image and the notification image in an overlapping state.

According to this configuration, the important information can be communicated to the driver in an intuitive manner. This makes it possible to reduce the likelihood of a traffic accident.

Other Embodiments

The foregoing embodiment has been described as an example of the technique disclosed in the present application. However, the technique in the present disclosure is not limited thereto, and can also be applied in embodiments in which modifications, replacements, additions, or omissions have been made as appropriate. New embodiments can also be made by combining the constituent elements described in the foregoing embodiment with those described in the other embodiments below.

Examples of other embodiments will therefore be described next.

Figure 15:
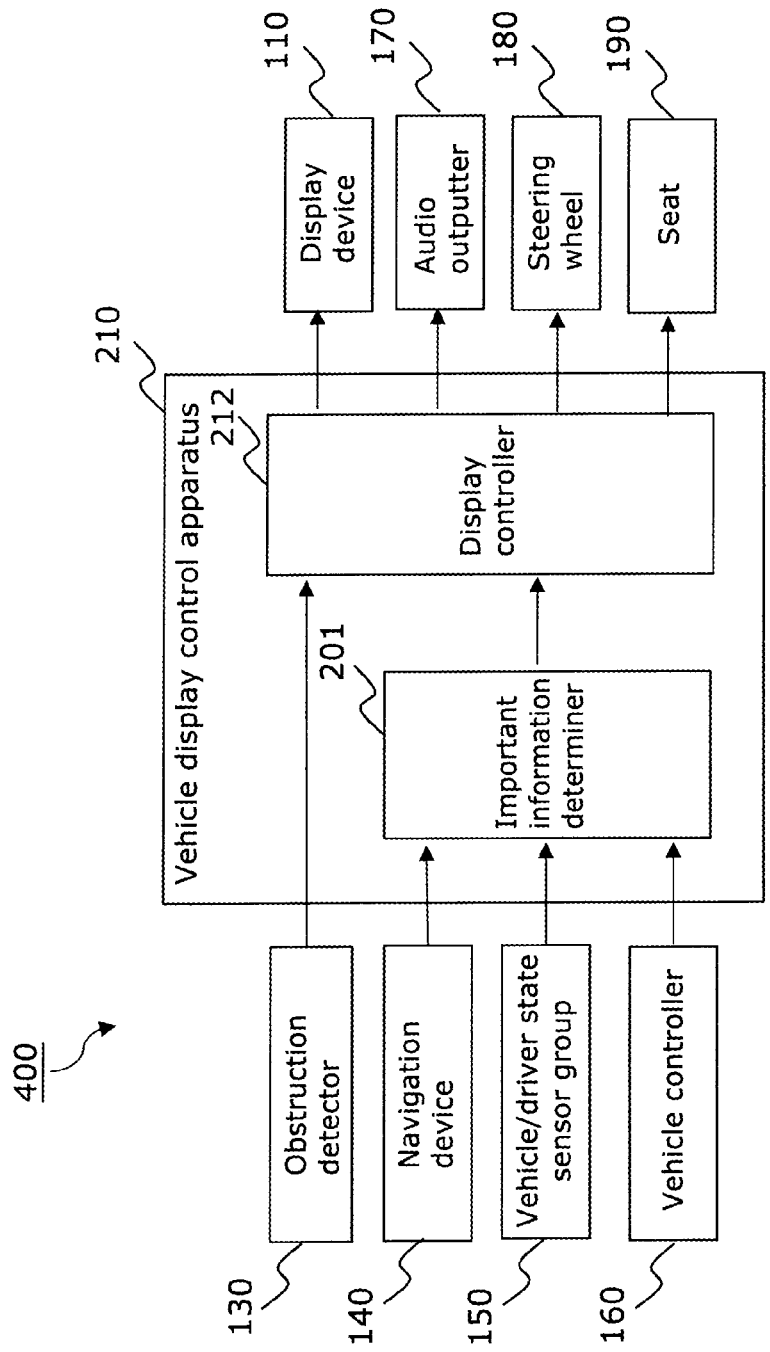
FIG. 15 is a diagram illustrating an example of the configuration of a driving assistance system according to another embodiment.

FIG. 15 is a diagram illustrating an example of the configuration of a driving assistance system according to another embodiment of the present disclosure. In vehicle display control apparatus 210 illustrated in FIG. 15, constituent elements which perform the same operations as in vehicle display control apparatus 200 according to Embodiment 1 are assigned like reference signs, and will not be described.

As illustrated in FIG. 15, in driving assistance system 400, display controller 212 of vehicle display control apparatus 210 may communicate important information to the driver using audio outputter 170, steering wheel 180, and seat 190, in addition to display device 110.

Display controller 212 may cause audio outputter 170 to output audio indicating the important information while the important information is being displayed. For example, an amount of time in which the host vehicle is expected to collide with an obstruction may be calculated, and audio may be output when that amount of time has dropped below a predetermined amount of time. The audio to be output may be a buzzer or the like.

Additionally, display controller 212 may also flash the information displayed in display device 110 in synchronization with the audio being output by audio outputter 170.

Additionally, display controller 212 may vibrate steering wheel 180 when important information is being displayed in display device 110.

Additionally, display controller 212 may vibrate seat 190 when important information is being displayed in display device 110.

Additionally, display controller 212 may make the driver aware of the important information using a device in the vehicle (not shown), e.g., a lighting device installed in the vehicle may be turned on.

Additionally, display controller 212 may cause a plurality of devices to operate in tandem, such as vibrating steering wheel 180 and seat 190 simultaneously.

In this manner, the important information can be communicated to the driver in an intuitive manner by communicating the important information through audio outputter 170, steering wheel 180, seat 190, and the like.

Additionally, the brightnesses of the virtual marker image and notification image may be changed according to ambient lighting, weather conditions, and the like. For example, the brightnesses of the images may be reduced at night. The brightnesses may be increased when driving on snowy roads. Setting the display formats according to ambient lighting, the time, and so on in this manner makes it easier for the driver to recognize the images.

Additionally, when there are a plurality of the notification images, the notification image having the highest priority may be selected for display. This makes it possible to reduce situations where the driver is annoyed by the images.

The foregoing embodiments have been described as examples of the technique according to the present disclosure. The accompanying drawings and detailed descriptions have been provided to that end.

As such, the constituent elements indicated in the accompanying drawings and the detailed descriptions include not only constituent elements necessary to solve the technical problem, but also constituent elements not necessary to solve the problem but used to exemplify the above-described technique. Those unnecessary constituent elements being included in the accompanying drawings, the detailed description, and so on should therefore not be interpreted as meaning that the unnecessary constituent elements are in fact necessary.

Additionally, the foregoing embodiments are provided merely as examples of the technique according to the present disclosure, and thus many changes, substitutions, additions, omissions, and the like are possible within the scope of the claims or a scope equivalent thereto.

While various embodiments have been described herein above, it is to be appreciated that various changes in form and detail may be made without departing from the spirit and scope of the present disclosure as presently or hereafter claimed.

Further Information about Technical Background to this Application

The disclosure of the following Japanese Patent Application including specification, drawings and claims are incorporated herein by reference in its entirety: Japanese Patent Application No. 2019-237032 filed on Dec. 26, 2019.

INDUSTRIAL APPLICABILITY

The present disclosure is useful in technology which is installed in a vehicle and communicates a state of obstructions, other vehicles, and so on to the driver of the vehicle.

The invention claimed is:

1. A vehicle display control apparatus that controls a display which is installed in a vehicle and which, by projecting an image onto a display medium, superimposes the image over a scene in front of the vehicle to cause a driver to see a superimposed image as a virtual image, the vehicle display control apparatus comprising:
 a processor; and
 a memory including at least one program that, when executed by the processor, causes the processor to perform operations, the operations including:
  based on a result of detection by an obstruction sensor that detects an obstruction present in a periphery of the vehicle, detecting obstruction information including a relative position and a relative speed of the obstruction relative to the vehicle;
  obtaining information including the periphery of the vehicle and a state of the vehicle, and detecting, as important information, information that is to be communicated to the driver over the obstruction information;
  when the obstruction sensor is operating, converting, into a virtual marker image, a detection target region which is contained within a detection range of the obstruction sensor and which extends from the vehicle to the periphery of the vehicle along a road surface, and causing the virtual image to be displayed by superimposing the virtual marker image over the scene in the front of the vehicle using the display;
  when the relative position of the obstruction is within the detection target region, causing an image indicating a direction in which the obstruction is located to be displayed in a region of the virtual marker image in a direction based on the relative position of the obstruction, using the obstruction information; and
  when the important information is detected, converting the important information into a notification image and causing the notification image to be displayed at a predetermined position of the display medium using the display,
 wherein, when causing the virtual marker image and the notification image to be displayed simultaneously, the processor changes a display format of at least one of the virtual marker image or the notification image,
 the notification image is configured to be displayed at the predetermined position of the display medium, and
 when the notification image overlaps with the virtual marker image and the image indicating the direction in which the obstruction is located, the processor moves the notification image from the predetermined position to a different position than the virtual marker image and the image indicating the direction in which the obstruction is located.

2. The vehicle display control apparatus according to claim 1,
 wherein the processor detects guidance information including at least one of route information, traffic congestion information, and warning information, and
 the processor detects the guidance information as the important information.

3. The vehicle display control apparatus according to claim 1,
 wherein the vehicle includes a vehicle/driver state sensor group that detects the state of the vehicle or a state of the driver, and
 the processor detects, as the important information, information indicating an abnormal state of the vehicle or an abnormal state of the driver from the state of the vehicle or the state of the driver detected by the vehicle/driver state sensor group.

4. The vehicle display control apparatus according to claim 1,
 wherein the vehicle includes a vehicle controller that controls driving of the vehicle and outputs driving information indicating a driving state of the vehicle, and
 the processor detects the important information from the driving information output by the vehicle controller.

5. The vehicle display control apparatus according to claim 1,
 wherein the processor changes the display format of the notification image by at least one of increasing a brightness, increasing a saturation, or changing a color.

6. The vehicle display control apparatus according to claim 5,
 wherein, when the processor determines that the driver sees the virtual marker image and the notification image in an overlapping state, the processor changes a display position of the notification image.

7. The vehicle display control apparatus according to claim 1,
 wherein the processor changes the display format of the virtual marker image by at least one of changing a color or reducing a size.

8. The vehicle display control apparatus according to claim 7,
 wherein, when the processor determines that the driver sees the virtual marker image and the notification image in an overlapping state, the processor changes the display format of at least one of the virtual marker image or the notification image to a display format in which the driver does not see the virtual marker image and the notification image in the overlapping state.

9. The vehicle display control apparatus according to claim 7,
 wherein when the processor determines that the driver sees the virtual marker image and the notification image in an overlapping state, the processor performs control so that the virtual marker image is not displayed in the display.

10. The vehicle display control apparatus according to claim 7,
 wherein the processor outputs the obstruction information to a navigation device included in the vehicle display control apparatus.

11. The vehicle display control apparatus according to claim 1,
 wherein the vehicle includes a speaker, and
 when causing the notification image to be displayed in the display, the display controller causes the speaker to output audio indicating the important information.

12. The vehicle display control apparatus according to claim 1,
 wherein the display controller causes an arc-shaped ripple spreading in a direction corresponding to the relative position of the obstruction to be displayed as the image indicating the direction in which the obstruction is located.

13. A vehicle display control method of controlling a display which is installed in a vehicle and which, by projecting an image onto a display medium, superimposes the image over a scene in front of the vehicle to cause a driver to see a superimposed image as a virtual image, the vehicle display control method comprising:
 detecting, based on a result of detection by an obstruction sensor that detects an obstruction present in a periphery of the vehicle, obstruction information including a relative position and a relative speed of the obstruction relative to the vehicle;

obtaining information including the periphery of the vehicle and a state of the vehicle, and detecting, as important information, information that is to be communicated to the driver over the obstruction information;

when the obstruction sensor is operating, converting, into a virtual marker image, a detection target region which is contained within a detection range of the obstruction sensor and which extends from the vehicle to the periphery of the vehicle along a road surface, and causing the virtual image to be displayed by superimposing the virtual marker image over the scene in the front of the vehicle using the display;

when the relative position of the obstruction is within the detection target region, causing an image indicating a direction in which the obstruction is located to be displayed in a region of the virtual marker image in a direction based on the relative position of the obstruction, using the obstruction information; and when the important information is detected, converting the important information into a notification image and causing the notification image to be displayed at a predetermined position of the display medium using the display device, wherein, when causing the virtual marker image and the notification image to be displayed simultaneously, a display format of at least one of the virtual marker image or the notification image is changed, the notification image is configured to be displayed at the predetermined position of the display medium, and when the notification image overlaps with the virtual marker image and the image indicating the direction in which the obstruction is located, the processor moves the notification image from the predetermined position to a different position than the virtual marker image and the image indicating the direction in which the obstruction is located.

* * * * *